United States Patent
Zago

(10) Patent No.: US 9,435,117 B2
(45) Date of Patent: Sep. 6, 2016

(54) FLOOR SLAB AND FLOOR COMPRISING SUCH A SLAB

(71) Applicants: Grands Magasins de la Samaritaine Maison Ernest Cognacq, Paris (FR); LUXINOV, Kopstal (LU)

(72) Inventor: Denis Zago, Niederanven (LU)

(73) Assignees: GRANDS MAGASINS DE LA SAMARITAINE MAISON ERNEST COGNACQ, Paris (FR); LUXINOV, Kopstal (LU)

( * ) Notice: Subject to any disclaimer, the term of this patent is extended or adjusted under 35 U.S.C. 154(b) by 0 days.

(21) Appl. No.: 14/896,858

(22) PCT Filed: Jun. 4, 2014

(86) PCT No.: PCT/FR2014/051334
§ 371 (c)(1),
(2) Date: Dec. 8, 2015

(87) PCT Pub. No.: WO2014/199050
PCT Pub. Date: Dec. 18, 2014

(65) Prior Publication Data
US 2016/0168848 A1 Jun. 16, 2016

(30) Foreign Application Priority Data

Jun. 10, 2013 (FR) .................................... 13 55315

(51) Int. Cl.
*E04B 1/94* (2006.01)
*E04B 5/02* (2006.01)
(Continued)

(52) U.S. Cl.
CPC ................. *E04B 1/942* (2013.01); *E04B 5/02* (2013.01); *E04C 2/296* (2013.01); *E04C 2/34* (2013.01); *E04C 2/50* (2013.01); *E04C 2/54* (2013.01); *E04F 15/10* (2013.01)

(58) Field of Classification Search
CPC .......... E04B 1/942; E04B 5/02; E04B 5/023; E04C 2/34; E04C 2/54; E04C 2/296; E04F 15/10; Y10T 428/162; Y10T 428/166; Y10T 428/16; Y10T 428/24562
USPC ....... 52/384, 385, 388, 389, 506.03, 506.04, 52/506.06, 507; 428/920, 921
See application file for complete search history.

(56) References Cited

U.S. PATENT DOCUMENTS 4,173,668 A * 11/1979 Hentzelt ........... B23B 17/10036
156/99
4,485,601 A * 12/1984 De Boel ........... B23B 17/10311
428/34

(Continued)

FOREIGN PATENT DOCUMENTS

GB 2373005 A 9/2002
WO WO-96/04437 A1 2/1996

OTHER PUBLICATIONS

International Search Report for related International Application No. PCT/FR2014/051334; report dated Jul. 30, 2014.

Primary Examiner — Brian Glessner
Assistant Examiner — Adam Barlow
(74) Attorney, Agent, or Firm — Miller, Matthias & Hull LLP

(57) ABSTRACT

A slab comprising: a top traffic plate designed to form a floor element allowing the circulation of persons and to allow light to pass through; a translucent bottom plate forming a thermal barrier; an intumescent layer designed to increase in volume from a predefined temperature, arranged between the top and bottom plates, and to allow light to pass through; and an expansion space between the top and bottom plates, the expansion space being designed to allow expansion of the intumescent layer.

12 Claims, 2 Drawing Sheets

(51) Int. Cl.
*E04C 2/54* (2006.01)
*E04C 2/296* (2006.01)
*E04C 2/34* (2006.01)
*E04F 15/10* (2006.01)

(56) References Cited

U.S. PATENT DOCUMENTS

| | | | | |
|---|---|---|---|---|
| 4,999,964 A | * | 3/1991 | Taylor | E04B 5/46 52/477 |
| 5,244,709 A | | 9/1993 | Vanderstukken | |
| 5,397,645 A | * | 3/1995 | Varma | B23B 17/10045 252/606 |
| 5,496,640 A | * | 3/1996 | Bolton | B23B 17/10 428/220 |
| 6,413,618 B1 | * | 7/2002 | Parker | B23B 3/14 428/195.1 |
| 6,446,404 B1 | * | 9/2002 | Bassin | A47B 96/18 428/45 |
| 7,694,475 B2 | * | 4/2010 | Rae | E06B 3/6617 52/263 |
| 8,281,550 B1 | * | 10/2012 | Bolton | C09K 91/10 428/921 |
| 2008/0138560 A1 | * | 6/2008 | Windmoller | B23B 3/02 428/46 |
| 2010/0015420 A1 | * | 1/2010 | Riebel | B23B 27/06 428/203 |
| 2011/0262720 A1 | * | 10/2011 | Riebel | B23B 7/12 428/195.1 |
| 2013/0196091 A1 | * | 8/2013 | Wildenhain | B23B 17/069 428/34 |

* cited by examiner

FLOOR SLAB AND FLOOR COMPRISING SUCH A SLAB

CROSS-REFERENCE TO RELATED APPLICATION

This Application is a 35 USC §371 US National Stage filing of International Application No. PCT/FR2014/051334 filed on Jun. 4, 2014, and claims priority under the Paris Convention to French Patent Application No. 13 55315 filed on Jun. 10, 2013.

FIELD OF THE DISCLOSURE

The present invention relates to floor slabs allowing the circulation of persons, and floors comprising such slabs.

BACKGROUND OF THE INVENTION DISCLOSURE

Fire safety regulations, particularly those applicable to public buildings, impose strict requirements to be respected.

To this end, two criteria can be evaluated: Reaction to fire and resistance to fire, both codified on national and European levels.

Reaction to fire is the representation of a material as a combustible (combustibility, flammability), defined by the classification M in France and by the Euroclass classifications Ax sx dx in Europe.

Fire resistance is the time during which the construction element plays its role in limiting propagation.

The object of the present invention is to propose a slab that has good fire-resistant properties.

As indicated above, fire resistance indicates the time during which, during a fire, a construction element (wall, floor, ceiling, door, etc.) Retains its physical and mechanical properties. This material is classified into three categories:

mechanical strength or load-bearing capacity;
resistance to flames and to hot gases; and
Thermal insulation.

The French classification thus distinguishes three categories:

fire stability SF: the construction element maintains, during the time indicated, its load-bearing and self-supporting capacities;

fire integrity PF: the element is fire stable and prevents, during the time indicated, the propagation, to the unexposed side, of combustion gases and smoke; and fire check CF: The element is fire resistant and prevents, during the time indicated, the propagation of heat to the unexposed side.

Thermal insulation corresponds to a maximum of 180° C. in a specific point, and to 140° C. on the entire surface (a door for example).

The SF, PF and CF criteria are noted in fractions of hours (¼ hour, ½ hour, ¾ hour, 1 hour, 1½ hour, hours, 2 hours, 3 hours, 4 hours, 6 hours). For example, "SF 2 hours" means fire stable for 2 hours.

The fire resistance Euroclasses are also distinguished into three classes:

R: mechanical strength or stability
E: resistance to gases and flames
I: thermal insulation (used when required in addition to an R or E classification)

These letters are followed by two or three numbers giving the resistance time in minutes. For example, <<REI 120>> means fire resistant for 120 minutes.

Intumescent materials are known that expand under the action of heat to form an insulating microporous foam called "meringue." This protects the supports from flames, limits fire propagation and retards the temperature of materials from rising.

However, these materials are heavy and very expensive, therefore their usual modes of use are ill-adapted to protecting slabs from fire.

The object of the present invention is to mitigate this disadvantage.

SUMMARY OF THE DISCLOSURE

For this purpose, the object of the invention is a slab comprising:

a top traffic plate designed to form a floor element allowing the circulation of persons, the top plate being designed to allow light to pass through;

a translucent bottom plate forming a thermal barrier;

an intumescent layer designed to increase in volume from a predefined temperature, arranged between the top and bottom plates, the intumescent layer being designed to allow light to pass through; and an expansion space between the top and bottom plates, the expansion space being designed to allow the expansion of the intumescent layer.

Thanks to these arrangements, it is possible to use an intumescent layer with a low degree of fire resistance and a thin thickness, and thus with lower weight and cost, and to end up with a light and inexpensive slab whose degree of fire resistance is multiplied by at least three.

In various embodiments of the slab according to the invention, one may possibly also have recourse to one and/or the other of the following arrangements:

the bottom plate comprises a glass underlay and a marble underlay fixed to each other;

the glass underlay and the marble underlay each present a thickness of between 4 and 10 mm;

the expansion space comprises a first expansion zone between the intumescent layer and the top plate, and a second expansion zone between the intumescent layer and the bottom plate;

each expansion zone presents a thickness at least equal to 3 mm;

the top plate comprises at least three glass underlays;

the intumescent layer is in glass and presents a thickness of between 10 and 50 mm; and the slab presents a total thickness of between 50 and 100 mm.

Another object of the invention is a floor comprising a supporting framework and a plurality of slabs such as described previously fixed to the supporting framework.

In various embodiments of the floor according to the invention, one may possibly also have recourse to one and/or the other of the following arrangements:

the supporting framework comprises a mesh of metal sections and a thermal insulation device surrounding the sections;

the thermal insulation device comprises at least one insulation block in fibro-silicate; and the thermal insulation device comprises at least one element chosen from among an intumescent strip and an intumescent paint.

BRIEF DESCRIPTION OF THE DRAWINGS

The invention will be better understood upon reading the following description of one of its embodiments, given only by way of non-limiting example and by referring to the appended drawings, in which.

MORE DETAILED DESCRIPTION OF THE DISCLOSURE

In the various figures, the same references designate identical or similar elements.

Figure 1:
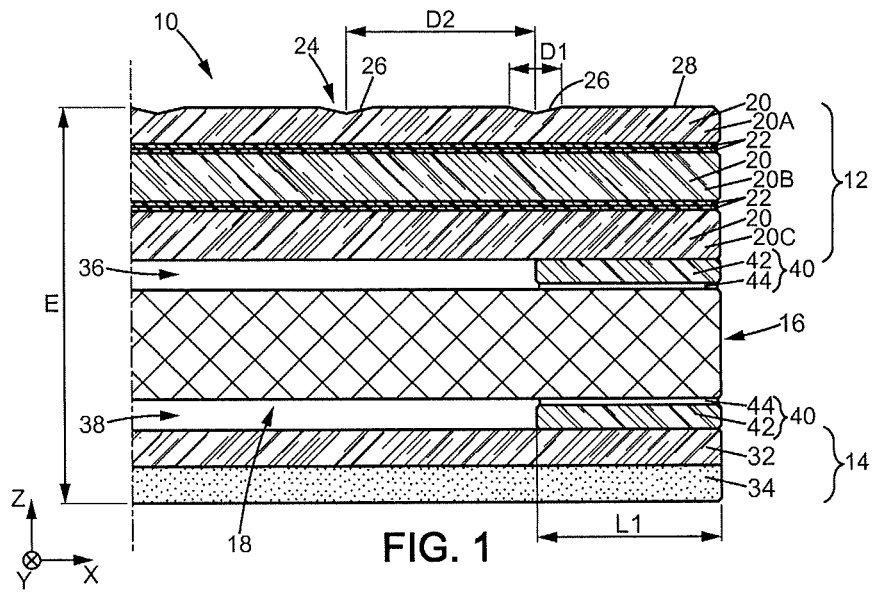
FIG. 1 is a vertical cross-sectional view of a part of a slab according to the invention.

FIG. 1 illustrates part of a slab 10 according to the invention.

In the following, the position and orientation terms used such as "above," "below," "vertical," "horizontal," "longitudinal," transverse," etc. are used relative to the XYZ reference indicated in FIG. 1 in which:

the X axis is the longitudinal axis;
the Y axis is the transverse axis; and
the Z axis is the vertical axis.

Slab 10 comprises a top plate 12, a bottom plate 14, an intermediate layer 16 arranged between the top 12 and bottom 14 plates, and an expansion space 18 between the top 12 and bottom 14 plates.

The top plate 12 is a traffic plate designed to form a floor element allowing the circulation of persons.

In particular, the top plate 12 may be designed to be able to withstand a load of at least 500 kg/m$^2$, the maximum load depending on the dimensions of the slab 10.

The top plate 12 is designed to allow light to pass through, i.e., it may be translucent or transparent.

The top plate 12 comprises at least three glass underlays 20. The number of underlays is determined by floor slab standards. Therefore, depending on the country under consideration, the composition of the top plate 12 may be very variable, ranging for example from a single 6+6 mm laminate to a tri-laminate as required in France.

In the example described here, the top plate 12 is a tri-laminate plate and comprises exactly three underlays 20 stacked on top of each other, including one top underlay 20A, one intermediate underlay 20B and one bottom underlay 20C.

Each underlay 20A, 20B, 20C can be in tempered extra white glass.

The top underlay 20A may present a thickness along the vertical axis Z of between 5 and 7 mm, for example substantially equal to 6 mm.

The intermediate underlays 20B and bottom underlays 20C may present a thickness of between 7 and 9 mm, for example substantially equal to 8 mm. As described previously in relation to the number of underlays of top plate 12, the thickness of the underlays and their treatments (tempering, annealing, etc.) Are dictated by national floor slab standards.

Underlays 20A, 20B, 20C may for example be fixed to each other by two clear films 22 in PVB (polyvinyl butyral).

The clear films 22 may in particular each present a thickness of between 0.70 and 0.80 mm, for example substantially equal to 0.76 mm.

In a variation, providing more than two clear films 22, for example three or four clear films, is of course possible.

The top underlay 20A comprises a grooving 24 comprising a plurality of longitudinal and transverse grooves 26 machined on the upper surface 28 of the slab 10.

Grooves 26 present a V-shaped profile with a vertical Z-axis depth of between 0.5 and 2.5 mm, for example substantially equal to 1 mm.

Longitudinal and transverse grooves 26 respectively extend along the longitudinal axis X and the transverse axis Y over a distance D1 in particular between 8 and 9 mm, for example substantially equal to 8.6 mm, and respectively along the transverse axis Y and the longitudinal axis X over the entire length of slab 10.

Grooves 26, transverse and longitudinal respectively, may be spaced apart by a distance D2 of between 25 and 35 mm, for example substantially equal to 31 mm.

Figure 2:
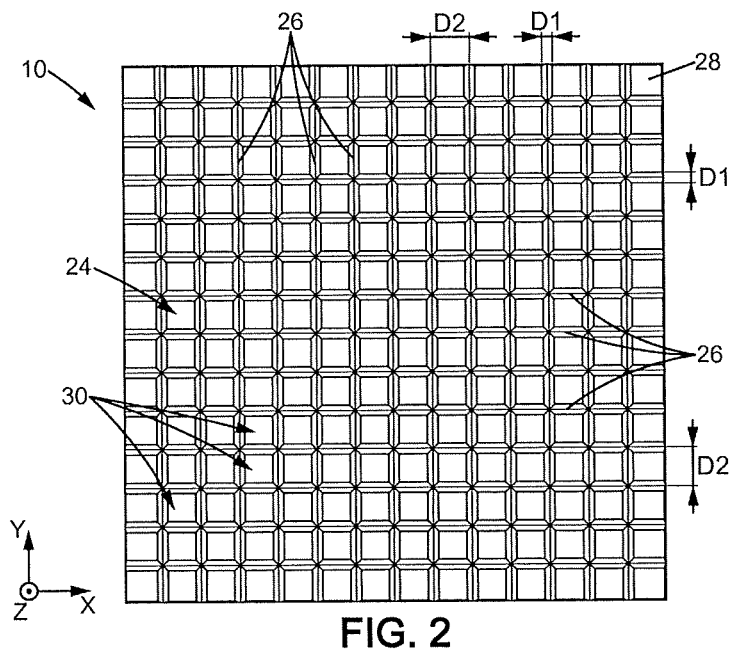
FIG. 2 is a top view of the slab from FIG. 1.

As illustrated in FIG. 2, grooves 26 thus form a square decorative pattern 30 which repeats regularly over the entire upper surface 28 of slab 10.

In a variation, grooves 26 may present any contour, for example a U-shaped or W-shaped contour.

In a variation, slab 10 may comprise any decorative pattern. It may also not comprise any pattern at all.

In a variation, the upper surface 28 of slab 10 may receive a sandblasting or glass grinding treatment, etching, silk-screening, etc.

In a variation, the top plate 12 may be single-layer or bi-layer.

With reference to FIG. 1, bottom plate 14 is a translucent plate forming a thermal barrier.

Bottom plate 14 may comprise a first glass underlay 32 and a second marble underlay 34 fixed to each other, particularly by bond-welding. Fixation by bond-welding presents the advantage of not introducing an interleaving material such as a PVB film that tends to yellow over time and that provides a heat input because it is combustible. In fact, bond-welding is a fixation method in which there is an energy input in the form of photons that allow molecular bonding between the materials with very little input of organic matter. Thus, the finished product is very resistant to UV radiation, differences in temperature, moisture and pollution and ages very well over time.

The first underlay 32 is in extra white glass and enables the bottom plate 14 to be rigidified.

The marble used for the second underlay 34 is for example Thassos marble.

The glass underlay 32 and the marble underlay 34 each present a thickness of between 4 and 10 mm; for example substantially equal to 6 mm.

It is interesting to note that the bond-welding assembly method obtains a virtually monolithic bottom plate 14, i.e., in which the glass and marble underlays are inseparably linked. The mechanical properties of this assembly are particularly good and the mechanical strength of the complex thus obtained is higher than a glass or marble plate of similar thickness. The bond-welding method creates a mechanical strength synergy.

In the embodiment described here, the glass underlay 32 is disposed above the marble underlay 34.

In a variation, the reverse is possible, i.e., the marble underlay 34 may be disposed above the glass underlay 32.

In yet another variation, the marble underlay 34 may be replaced by a granite underlay. In this case, the granite underlay presents a thickness of less than 2 mm, for example substantially equal to 1 mm.

The thickness of the second marble or granite underlay 34 is chosen to be sufficiently thin so as to ensure a translucent appearance, but not too thin so as to guarantee sufficient rigidity and good fire resistance.

The intermediate layer 16 is an intumescent layer designed to increase in volume from a predetermined temperature.

The intumescent layer 16 is designed to allow light to pass through, i.e., it may be translucent or transparent.

The intermediate layer 16, subsequently called intumescent layer 16, is in glass and presents a thickness of between 10 and 50 mm, for example substantially equal to 18 mm.

The glass used for the intumescent layer 16 is a 30-minute fire-resistant glass (known as <<CF ½ h>> according to the French classification), for example the glass sold by the Pyrostop® brand.

Thus, when the local temperature of the intumescent layer 16 reaches the activation temperature of the intumescent gel forming the layer (for example between 450 and 550° C.), the intumescent layer 16 begins to foam and expand.

In a variation, the glass used for the intumescent layer 16 may be a higher-degree fire resistant glass, for example CF 2-hour, CF 3-hour, CF 4-hour or more.

The expansion space 18 is designed to allow expansion of the intumescent layer 16.

The expansion space 18 comprises a first expansion zone 36 between the intumescent layer 16 and the top plate 12, and a second expansion zone 38 between the intumescent layer 16 and the bottom plate 14.

Each expansion zone 36, 38 presents a thickness at least equal to 3 mm, for example substantially equal to 4 mm.

To create expansion zones 36, 38, the slab 10 comprises two translucent or transparent peripheral counterbraces 40, respectively fixed on intumescent layer 16 and under bottom underlay 20C, and under intumescent layer 16 and on glass underlay 32.

Each counterbrace 40 comprises a wedge 42 in extra white glass and a thickness at least equal to 3 mm, for example substantially equal to 4 mm.

Wedges 42 are respectively fixed to the bottom underlay 20C and the glass underlay 32, particularly by bond-welding.

Each counterbrace 40 also comprises a translucent or transparent seal 44 and a thickness substantially equal to 1 mm, disposed respectively between the intumescent layer 16 and the wedge 42.

Seal 44 is a flexible seal having vibration absorbing properties, thereby enabling the expansion zones 36, 38 to be sealed, particularly against water and dust, but also to bear the loads supported by the slab.

Counterbraces 40 present a width L1 of between 25 and 50 mm, for example substantially equal to 30 mm. Width L1 can be reduced or increased according to the loads to bear and/or the size and shape of the slab 10. The stops of these counterbraces are preferably rounded to prevent incipient fractures from forming in the glass.

Therefore, counterbraces 40 not only enable the intumescent layer 16 to expand without controlling it, but also enable the slab to bear loads during use.

Therefore, slab 10 has a total thickness E of between 50 and 100 mm, in the example described here substantially equal to 65 mm.

In addition, slab 10 presents a square shape with sides between 350 and 500 mm, in the example here described substantially equal to 430 mm.

In a variation, slab 10 may present any shape, for example rectangular, triangular, octagonal, etc.

Figure 3:
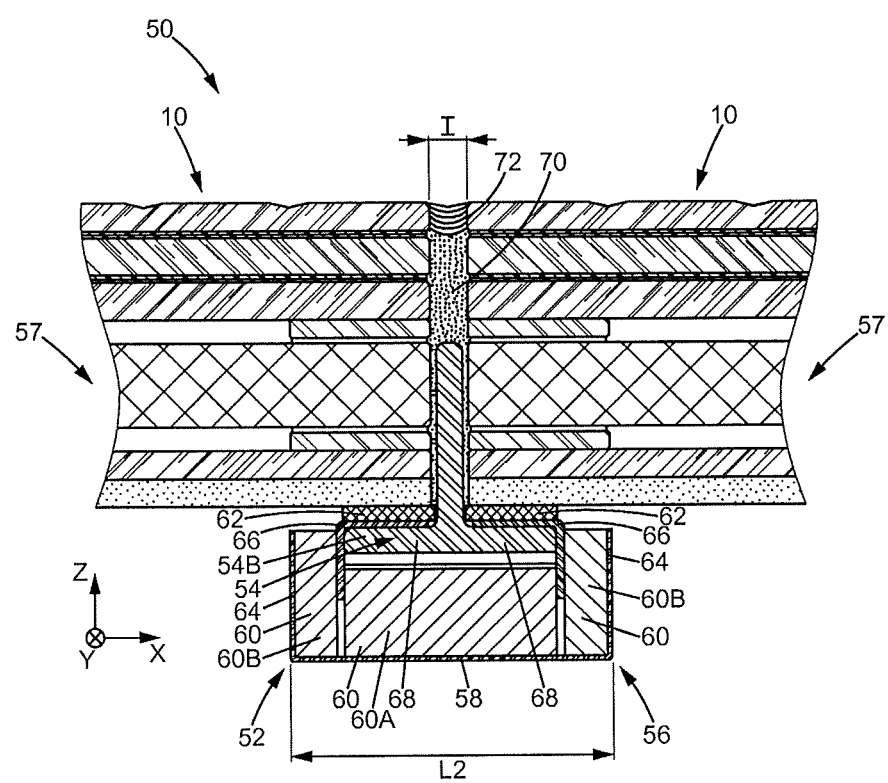
FIG. 3 is a vertical cross-sectional view of a part of a floor according to the invention.

FIG. 3 illustrates part of a floor 50 according to the invention.

Floor 50 comprises a plurality of slabs 10 and a supporting framework 52 on which the slabs 10 are fixed.

The supporting framework 52 comprises a mesh of metal sections 54 and a thermal insulation device 56 surrounding the sections 54.

The metal sections 54 comprise steel T-bars, including longitudinal T-bars 54A (not represented) which extend along the X-axis and transverse T-bars 54B which extend along the Y-axis.

The T-bars 54A, 54B are fixed to each other so as to form recesses 57 between them designed to each receive a slab 10.

The thermal insulation device 56 comprises a cover 58, at least one insulation block 60 and an intumescent strip 62.

The U-shaped cover 58 is made, in the example described here, of Aluzinc®, which guarantees good corrosion resistance and has a fire retardant role.

The cover 58 presents a width L2 of between 60 and 80 mm, for example substantially equal to 70 mm.

Three insulation blocks 60 in fibro-silicate, for example in Fibrodice MS®, are provided in the cover 58 to thermally insulate the T-bars 54A, 54B.

More specifically, a central insulation block 60A is fixed, particularly by bonding, into the bottom of the cover 58 and two lateral insulation blocks 60B are fixed, particularly by bonding, against the inside of sides 64 of the cover in U 58. The adhesive to use in these bondings is an adhesive with wear and fire reaction properties and which guarantees use under cold conditions, for example the <<LUX-2008-1>> adhesive supplied by the Luxinov company.

The lateral blocks 60B are spaced apart from the central block 60A so as to be able to insert metal angle sections 66 therein, particularly made of Aluzinc®, used to fix the thermal insulation device 56 to the T-bars 54A, 54B.

In particular, cover 58 and lateral blocks 60B are screwed onto angle sections 66 that are themselves bonded to sides 68 of T-bars 54A, 54B. One example of an adhesive that can be used for this purpose is the <<LUX-2010-MM>> adhesive supplied by the Luxinov company.

The intumescent strip 62 is fixed, and in particular bonded, to angle sections 66.

For example, the intumescent strip 62 is of the Flexilodice type.

In a variation, the thermal insulation device 56 of T-bars 54A, 54B may comprise an intumescent paint particularly applied to the outer face of cover 58.

Slabs 10 are centered within recesses 57 and are disposed on intumescent strips 62.

Interval I between each slab is between 8 and 15 mm, for example substantially equal to 9 mm.

Interval I is chosen according to the cross-section of T-bar used, the loads applied and the desired esthetic appearance.

This interval is filled with a molecular sieve 70 also used as an infill material, for example silica powder, enabling moisture to be absorbed and guaranteeing smoke control in the event of fire.

A finishing seal 72 in neutral silicone covers the molecular sieve and is treated so as to reproduce grooves 26, thereby guaranteeing sealing between the plates and homogeneity of the slab decorative pattern 30 (FIG. 2).

In a variation, seal 72 may be replaced by sealed metal inserts in stainless steel, LED strips, and other materials such as copper, brass, wood, etc.

Therefore the invention proposes a multilayer glass CF 1½ hour slab of thin thickness and a multilayer glass CF 1½ floor that are light and inexpensive.

In fact, the marble/glass plate acts as a heat barrier, the marble accumulating heat and gradually restoring it to the intumescent layer, thereby retarding expansion activation and thus the fire-resisting action of the CF ½-hour intumescent layer.

It is therefore possible to use thinner, lighter and less costly intumescent layers.

As described here, with a CF ½-hour intumescent layer, it is thus possible to obtain a CF 1½-hour slab, or with 3 times the fire-proofing capability of the intumescent layer.

In addition, the marble/glass plate brings a new esthetic appearance to the slab and diffuses soft light through the translucent slab.

In addition, assembling the various glass elements of the slab by bond-welding makes it possible to not have to introduce additional elements and thus makes it possible to have monolithic glass elements and single-block slabs, ready to be laid down, thereby saving installation time due to easy handling and storage, and in this way reducing flooring costs.

In addition, the thermal insulation device protects the supporting framework of the floor from fire and in this way guarantees the CF 1½-hour rating of the floor.

Any type of glass can be used for the various slab layers, for example variable-opacity glass, glass with metal layers, special glasses, etc.

In the same way, the different glass layers can have any thickness and treatment (float glass, colored glass, tempered glass, semi-tempered glass, silkscreened glass, etc.).

All dimensions given in the present description are purely illustrative and it is understood that the person skilled in the art will know to modify them depending on the dimensions and fireproofing properties that he wishes to obtain.

LIST OF NUMERICAL REFERENCES 10 slab
12 top plate
14 bottom plate
16 intumescent layer
18 expansion space
20 underlay
20A upper underlay
20B intermediate underlay
20C lower underlay
22 clear film
24 grooving
26 groove
28 upper surface
30 decorative pattern
32 first underlay
34 second underlay
36 first expansion zone
38 second expansion zone
40 counterbrace
42 wedge
44 seal
50 floor
52 supporting framework
54 metal section
54A longitudinal T-bar
54B transverse T-bar
56 thermal insulation device
57 recess
58 cover
60 insulation block
60A central insulation block
60B lateral insulation block
62 intumescent strip
64 cover side
66 metal angle section
68 T-bar side
70 molecular sieve
72 finishing seal

The invention claimed is:

1. A slab comprising:
   a top traffic plate designed to form a floor element allowing the circulation of persons, the top plate being designed to allow light to pass through;
   a translucent bottom plate forming a thermal barrier;
   an intumescent layer designed to increase in volume from a predefined temperature, arranged between the top and bottom plates, the intumescent layer being designed to allow light to pass through; and
   an empty expansion space between the top and bottom plates, wherein the expansion space is devoid of intumescent material and is designed to all the expansion of the intumescent layer into the expansion space.

2. The slab according to claim 1, in which the bottom plate comprises a glass underlay and a marble underlay fixed to each other.

3. The slab according to claim 2, in which the glass underlay and the marble underlay each present a thickness of between 4 and 10 mm.

4. The slab according to claim 1, in which the expansion space comprises a first expansion zone between the intumescent layer and the top plate, and a second expansion zone between the intumescent layer and the bottom plate.

5. The slab according to claim 4, in which each expansion zone presents a thickness at least equal to 3 mm.

6. The slab according to claim 1, in which the top plate comprises at least three glass underlays.

7. The slab according to claim 1, in which the intumescent layer is in glass and presents a thickness of between 10 and 50 mm.

8. The slab according to claim 1, presenting a total thickness of between 50 and 100 mm.

9. A floor comprising a supporting framework and a plurality of slabs according to of claim 1 fixed onto the supporting framework.

10. The floor according to claim 9, in which the supporting framework comprises a mesh of metal sections and a thermal insulation device surrounding the sections.

11. The floor according to claim 10, in which the thermal insulation device comprises at least one insulation block in fibro-silicate.

12. The floor according to claim 10, in which the thermal insulation device comprises at least one element chosen from among an intumescent strip and an intumescent paint.

* * * * *